United States Patent
Miyano et al.

(10) Patent No.: US 9,497,045 B2
(45) Date of Patent: Nov. 15, 2016

(54) COMMUNICATION SYSTEM AND MOBILE COMMUNICATION DEVICE FOR PROVIDING POSITION INFORMATION, MAP INFORMATION AND EVACUATION ROUTE IN CASE OF EMERGENCY

(75) Inventors: Tomoaki Miyano, Yokohama (JP); Satoshi Mizuta, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 812 days.

(21) Appl. No.: 13/575,172

(22) PCT Filed: Jan. 27, 2011

(86) PCT No.: PCT/JP2011/051645
§ 371 (c)(1),
(2), (4) Date: Jul. 25, 2012

(87) PCT Pub. No.: WO2011/093398
PCT Pub. Date: Aug. 4, 2011

(65) Prior Publication Data
US 2012/0295579 A1 Nov. 22, 2012

(30) Foreign Application Priority Data
Jan. 27, 2010 (JP) .................................. 2010-016047

(51) Int. Cl.
*H04M 11/04* (2006.01)
*H04L 12/66* (2006.01)
(Continued)

(52) U.S. Cl.
CPC ........... *H04L 12/66* (2013.01); *H04L 12/6418* (2013.01); *H04M 1/72536* (2013.01); *G08B 21/22* (2013.01); *G08B 27/006* (2013.01)

(58) Field of Classification Search
CPC ................ H04L 12/66; H04L 12/6418; H04M 1/72536; G08B 27/006; G08B 21/22
(Continued)

(56) References Cited

U.S. PATENT DOCUMENTS

2002/0006800 A1 1/2002 Mohi
2003/0195008 A1 10/2003 Mohi et al.
(Continued)

FOREIGN PATENT DOCUMENTS

JP 9065416 A 3/1997
JP 2003060752 A 2/2003
(Continued)

OTHER PUBLICATIONS

International Search Report and Written Opinion for PCT/JP2011/051645, dated Apr. 19, 2011.

*Primary Examiner* — Shahriar Behnamian
(74) *Attorney, Agent, or Firm* — Hauptman Ham, LLP

(57) ABSTRACT

According to an aspect, a communication system includes a mobile communication device and a communication device. The mobile communication device includes: a position information acquiring unit configured to acquire its own position information; and a communication unit configured to transmit the position information and an emergency signal. The communication device is configured to display, when detecting that the emergency signal and the position information of the mobile communication device are transmitted from the mobile communication device, the position information of the mobile communication device and its own position information on a display unit.

16 Claims, 9 Drawing Sheets

(51) Int. Cl.
  *H04L 12/64* (2006.01)
  *H04M 1/725* (2006.01)
  *G08B 21/22* (2006.01)
  *G08B 27/00* (2006.01)
(58) Field of Classification Search
  USPC ..................................................... 455/404.2
  See application file for complete search history.

(56) References Cited

U.S. PATENT DOCUMENTS

2005/0190053 A1* 9/2005 Dione ........................... 340/500
2008/0051104 A1* 2/2008 Mohi et al. ................. 455/456.1

FOREIGN PATENT DOCUMENTS

| | | | |
|---|---|---|---|
| JP | 2004221810 A | 8/2004 |
| JP | 2004318393 A | 11/2004 |
| JP | 2006053838 A | 2/2006 |
| JP | 2006250792 A | 9/2006 |
| JP | 2006524316 A | 10/2006 |
| JP | 2008059251 A | 3/2008 |
| JP | 2009065340 A | 3/2009 |
| JP | 2009193315 A | 8/2009 |
| JP | 2009198239 A | 9/2009 |
| JP | 2009296529 A | 12/2009 |
| JP | 2010004177 A | 1/2010 |

* cited by examiner

COMMUNICATION SYSTEM AND MOBILE COMMUNICATION DEVICE FOR PROVIDING POSITION INFORMATION, MAP INFORMATION AND EVACUATION ROUTE IN CASE OF EMERGENCY

CROSS-REFERENCE TO RELATED APPLICATION

This application is a National Stage of international application No. PCT/JP2011/051645 filed on Jan. 27, 2011 which designates the United States, and which is based upon and claims the benefit of priority from Japanese Patent Application No. 2010-016047, filed on Jan. 27, 2010.

FIELD

The present disclosure relates to a mobile communication device that establishes communication with a terminal, and a communication system including the mobile communication device.

BACKGROUND

Various functions have recently been mounted on a mobile communication device such as a mobile phone, and a communication system using the mobile communication device. One of these functions is a security function.

For example, Patent Literature 1 describes a mobile phone with an alarm that generates an alarm through a predetermined operation. Patent Literature 2 describes a criminal information notification apparatus that gives notice of pre-determined-area criminal information based upon information involved with a crime occurring in a predetermined area on a map. Patent Literature 3 describes a safety information providing apparatus that collects safety information and disaster information from domestic and local predetermined facilities, calculates a degree of trustworthiness of the collected safety information, and provides only the safety information, which has the degree of the trustworthiness greater than a predetermined value, to a user. Patent Literature 3 also describes a method of informing a user of a situation that the user approaches a dangerous area with an alarm.

CITATION LIST

Patent Literature

Patent Literature 1: Japanese Patent Application Laid-Open No. 2003-60752
Patent Literature 2: Japanese Patent Application Laid-Open No. 2006-53838
Patent Literature 3: Japanese Patent Application Laid-Open No. 2008-59251

TECHNICAL PROBLEM

However, even if the alarm is generated as in the apparatus described in Patent Literature 1, there might be no person to help the user in an empty area, even with a sound.

The apparatus described in Patent Literature 2 acquires criminal information, whereby the user can know a local criminal circumstance. However, the user has to confirm the information in the apparatus described in Patent Literature 2 by using a terminal. Unless the user does not confirm the information, the user cannot acquire the criminal information. If the user feels less alarmed, the apparatus cannot effectively be utilized.

The apparatus described in Patent Literature 3 gives an alarm when the user approaches a dangerous area, so that the apparatus prevents the user from approaching the dangerous area. However, there might be a case where the user has to pass the dangerous area even when the alarm is given. In such a case, it is difficult to take an appropriate security measure even when the user is warned with the alarm.

For the foregoing reasons, there is a need for a communication system and a mobile communication device that can enhance security effect so that a possibility that the user gets involved in a crime can be reduced.

SUMMARY

According to an aspect, a communication system includes: a mobile communication device that includes a position information acquiring unit configured to acquire its position information, and a communication unit configured to transmit the position information and an emergency signal; and a communication device that is configured to display, when detecting that the emergency signal and the position information of the mobile communication device are transmitted from the mobile communication device, the position information of the mobile communication device and its position information on a display unit.

Preferably, the communication device is a mobile communication device.

According to another aspect, the communication device is configured to display the position information of the mobile communication device and its position information on a map, and to display a route from its position to the position of the mobile communication device.

According to another aspect, the communication system further includes a server that is configured to establish communication with other communication devices. The server determines the communication device to which the emergency signal and the position information of the mobile communication device are transmitted based upon the position information of the mobile communication device, and transmits the emergency signal and the position information of the mobile communication device to the determined communication device, when detecting that the emergency signal is transmitted from the mobile communication device.

According to another aspect, the server is configured to transmit map information to the communication device based upon the position information transmitted from the mobile communication device and the communication device.

According to another aspect, the mobile communication device further includes an emergency switch, and is configured to transmit the emergency signal by the communication unit when an operation set beforehand is inputted to the emergency switch.

According to another aspect, the communication device is configured to acquire information of a holder of the mobile communication device, and to display the information in a manner that prevents his/her personal information from being leaked.

According to another aspect, a mobile communication device includes: a communication unit configured to communicate with a second mobile communication device; a position information acquiring unit configured to detect its position information; a map information acquiring unit configured to acquire map information; an image display unit configured to display an image; and a control unit configured to acquire position information of the second communication device through the communication unit, when detecting that an emergency signal is outputted from the second mobile communication device, and to display on the display unit an image including the map information acquired by the map information acquiring unit, its position information acquired by the position information acquiring unit, and the position information of the second mobile communication device, wherein its position information and the position information of the second mobile communication device are superimposed on the map information.

According to another aspect, the control unit is configured to display a route from its position to the position of the mobile communication device as being superimposed on the map information.

According to another aspect, the map information acquiring unit is configured to acquire the map information including the position information from an external storage device based upon the position information acquired by the position information acquiring unit.

According to another aspect, the position information acquiring unit is configured to acquire the position information according to a global positioning system.

According to another aspect, the control unit is configured to acquire information of a holder of the second mobile communication device, and displays the information in a manner that prevents his/her personal information from being leaked.

According to another aspect, the control unit is configured to delete the acquired information of the holder when the position information of the second mobile communication device satisfies a predetermined condition set beforehand.

According to another aspect, the communication unit is configured to acquire information of the second mobile communication device through a server.

According to another aspect, a mobile communication device includes: a communication unit configured to communicate with a second mobile communication device; a position information acquiring unit configured to detect its position information; a map information acquiring unit configured to acquire map information including information of a dangerous area; an image display unit configured to display an image; and a control unit configured to display, on the display unit, its position information, and a route for reaching an area outside the dangerous area, as being superimposed on the map information, when detecting that the mobile communication device is in the dangerous area based upon its position information and the map information.

According to another aspect, the control unit is configured to transmit its position information to the second communication device, when detecting that the mobile communication device is in the dangerous area.

According to another aspect, the map information acquiring unit is configured to acquire information of a safety place within the dangerous area, and the control unit is configured to display the information of the safety place as being superimposed on the map information.

ADVANTAGEOUS EFFECTS OF INVENTION

The communication system and the mobile communication device according to the present invention can enhance security effect, and can reduce a possibility that a user gets involved in a crime.

DESCRIPTION OF EMBODIMENTS

The present invention will be described with reference to the drawings. The present invention is not limited by the description below. The components described below encompasses ones that easily occur to those skilled in the art, ones substantially identical, and ones falling within the so-called equivalent scope. A mobile phone will be described below as one example of a mobile communication device. However, the subject to which the present invention is applied is not limited to the mobile phones. The present invention is applicable to various communication devices having a verbal communication function. For example, the present invention is applicable to PHSs (Personal Handy-Phone Systems) or PDAs as the mobile communication devices. The present invention is also applicable to a dedicated security device provided with a communication function as the mobile communication device. A fixed terminal can be used for a rescue-side communication device, described later, composing the communication system according to the present invention. For the fixed terminal, for example, a fixed-line phone, a multifunction periphery, and a PC (Personal Computer) can be used.

Figure 1:
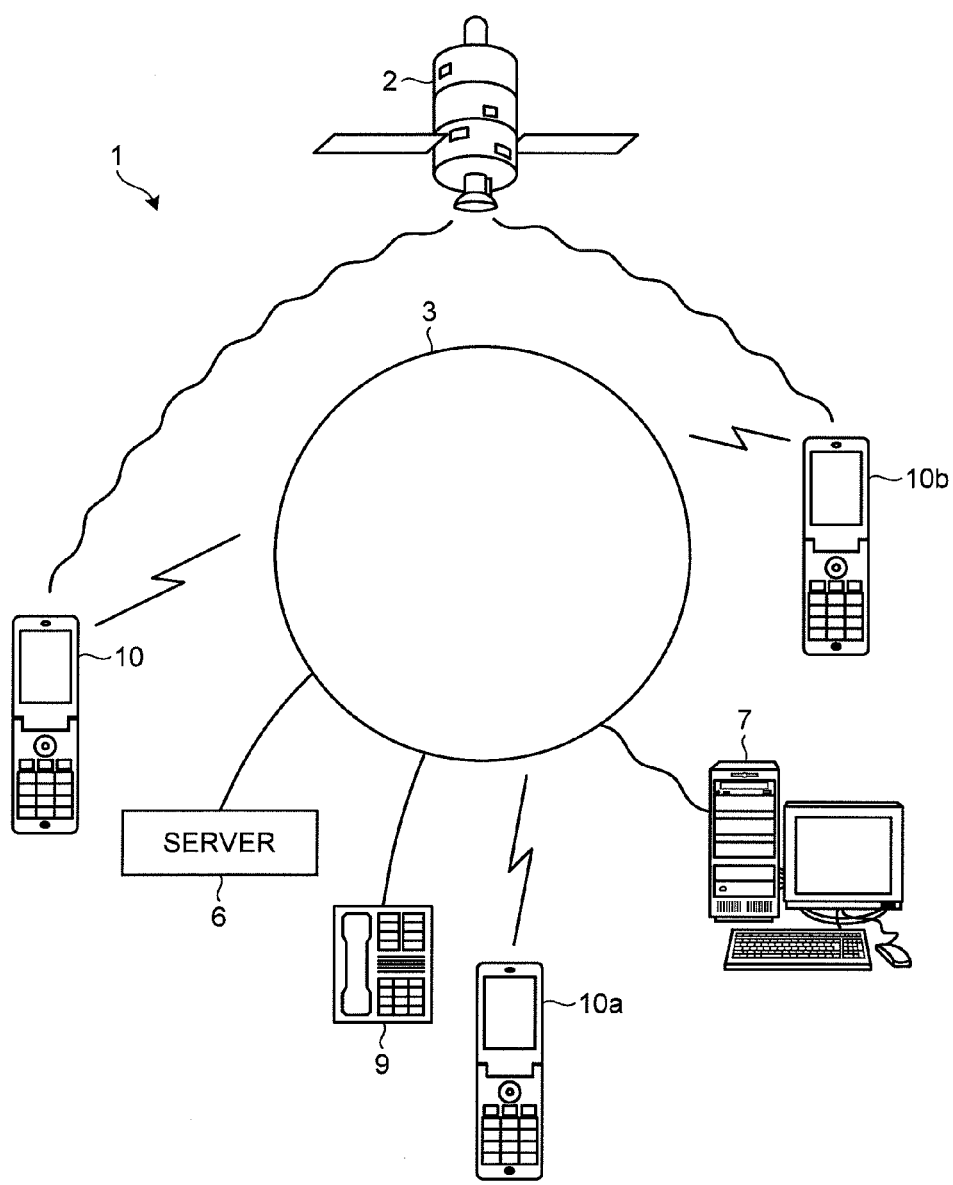
FIG. 1 is an explanatory view illustrating a schematic diagram of a communication system including a mobile communication device according to an embodiment.

FIG. 1 is an explanatory view illustrating a schematic configuration of a communication system provided with a mobile communication device according to an embodiment. A communication system 1 illustrated in FIG. 1 includes a GPS satellite 2, a communication network 3, a server 6, a fixed terminal 7, a fixed-line phone 9, and plural mobile communication devices 10, 10a, and 10b.

The GPS satellite 2 is a satellite that transmits (provides), to a communication device (communication terminal, communication equipment) having a communication function of GPS (Global Positioning System), position information thereof. FIG. 1 illustrates only one GPS satellite 2. However, the GPS satellites 2 in the number (mainly, three or four) required for specifying the position of communication device are arranged. The plural GPS satellite 2 output a GPS signal (position information and time information of the GPS satellite 2) needed for specifying the position information of the communication device. The communication device acquires its position information by analyzing the GPS signal outputted from the GPS satellite 2. The communication device may analyze the GPS signal by oneself, or the external server 6 may analyze the GPS signal.

The communication network 3 includes plural base stations, switching device, and wired communication line. The communication network 3 establishes information communication between the communication device and other communication device by using wired or wireless communication path. Various communication methods can be used, so long as they can establish communication between communication devices. For example, the communication network 3 may establish communication by using a satellite connection.

The server 6 has various data of map information and information (telephone number, address) for specifying the respective communication devices, and communicates with the communication devices through the communication network 3 so as to feed various information. The server 6 also relays information based upon the information, i.e., it receives various information such as the position information or GPS signal from the communication device, and transmits the information to the other communication devices. The fixed terminal 7 is a fixed-type information terminal having an information communication function, such as a PC (Personal Computer), and it is connected to the communication network 3 in a wired or wireless manner. The fixed terminal 7 receives and transmits information from and to the other communication devices via the communication network 3. The fixed-line phone 8 is a telephone apparatus connected to the communication network 3 via a wired phone line.

The mobile communication devices 10, 10a, and 10b are communication terminals that establish wireless communication with the communication network 3. The mobile communication device 10 transmits a signal such as a voice signal to the communication network 3, and receives a signal such as a voice signal from the communication network 3. A unique phone number and terminal number are assigned to each mobile communication device and stored. The configurations of the mobile communication devices 10, 10a, and 10b will be described later.

The communication system 1 is configured as described above. In the communication system 1, when an outgoing operation is inputted to the mobile communication device 10 by the user's operation, an outgoing signal and information of a phone number of the called party are transmitted to the communication network 3 from the mobile communication device 10. The communication network 3 searches the mobile communication device 10 to which the inputted phone number of the called party is assigned, and informs the mobile communication device 10 of the called party of the reception of the call. Thereafter, the communication system 1 establishes communication through the communication network 3, when the operation of starting the call is inputted to the mobile communication device 10 of the called party. Specifically, the communication system 1 sends and receives information through the communication network 3, thereby establishing communication between the mobile communication devices 10. The communication system 1 not only establishes communication between the mobile communication devices 10, but also can establish communication between the mobile communication device 10 and the server 6, between the mobile communication device 10 and the fixed terminal 7, and between the mobile communication device 10 and the fixed-line phone 9. The communication by the communication system 1 between the communication devices is not limited to a voice communication. The communication system 1 also sends and receives data. The mobile communication device 10 included in the communication system 1 can acquire position information from the GPS satellite 2. FIG. 1 illustrates only one server 6, one fixed terminal 7, one fixed-line phone 9, and only three mobile communication devices (10, 10a, 10b). However, the communication system 1 can include many servers 6, fixed terminals 7, fixed-line phones 9, and mobile communication devices 10.

Figure 2:
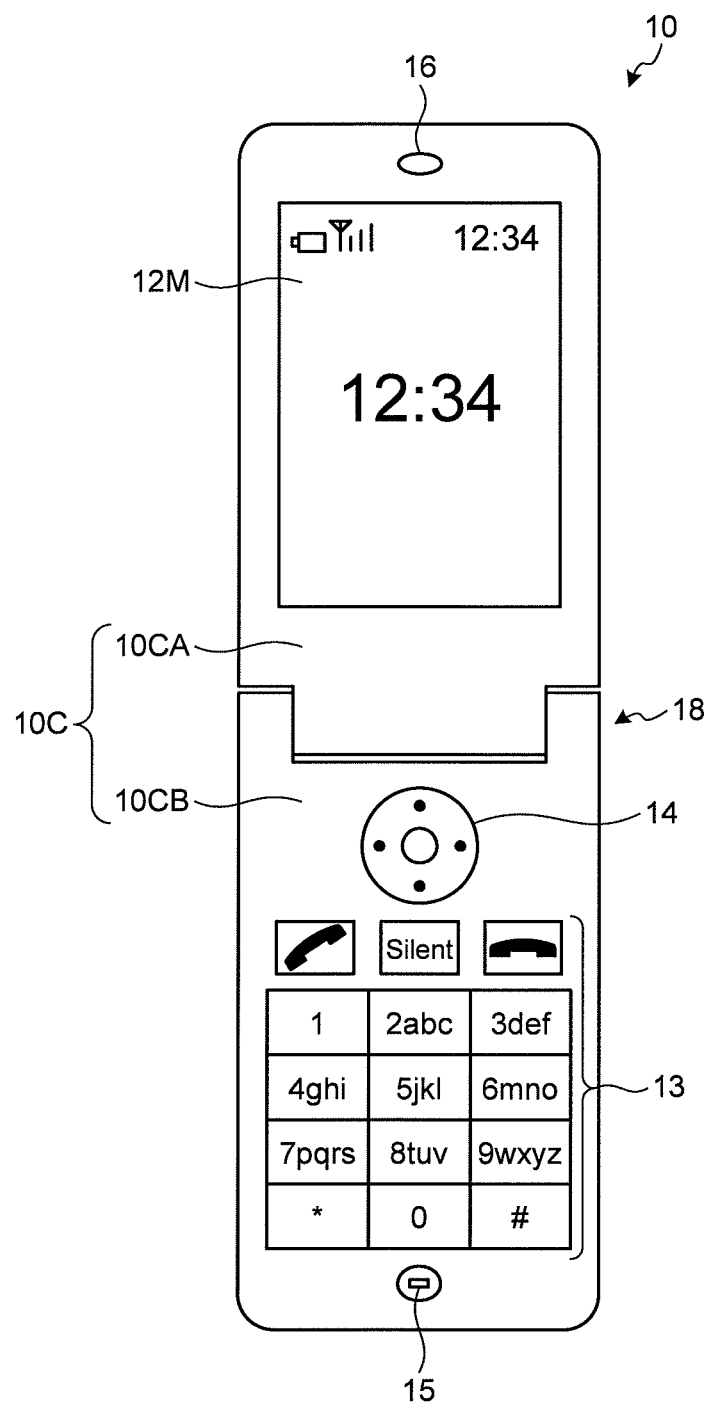
FIG. 2 is a front view illustrating the schematic configuration of the mobile communication device illustrated in FIG. 1.

The mobile communication devices 10, 10a, and 10b will next be described. The mobile communication device 10, the mobile communication device 10a, and the mobile communication device 10b have the same configuration. Therefore, the mobile communication device 10 will mainly be described. FIG. 2 is a front view illustrating a schematic configuration of the mobile communication device illustrated in FIG. 1. The mobile communication device 10 is a mobile phone provided with a wireless communication function. The mobile communication device 10 is a foldable type mobile phone having a housing 10C that includes a first housing 10CA and a second housing 10CB configured to be opened and closed. FIG. 2 illustrates the mobile communication device 10 in an opened state. In the present embodiment, the housing 10C of the mobile communication device 10 is foldable. However the shape of the housing is not particularly limited. Various housings can be employed. For example, the housing may be a slide-type, a cycloid-type, a revolver-type, and a straight-type.

The first housing 10CA has a main display 12M illustrated in FIG. 2 as a display unit. The main display 12M displays, as a predetermined image, a standby screen when the mobile communication device 10 waits for the reception, or displays a menu screen used for assisting the operation of the mobile communication device 10. As illustrated in FIG. 2, the first housing 10CA is provided with a receiver 16 that emits a voice during a call of the mobile communication device 10.

The second housing 10CB is provided with plural operation keys 13 for inputting the phone number of the call party and characters upon composing a mail. The second housing 10CB is also provided with a direction/enter key 14 for easily selecting the menu, deciding the menu, and scrolling the screen displayed on the main display 12M. The operation keys 13 and the direction/enter key 14 form an operating unit 28 (see FIG. 3) of the mobile communication device 10. The second housing 10CB is provided with a microphone 15 that receives a voice during a call of the mobile communication device 10.

The first housing 10CA and the second housing 10CB are coupled with a hinge 18. Therefore, the first housing 10CA and the second housing 10CB rotate about the hinge 18 to move in the direction in which they are apart from each other and in the direction in which they are close to each other. When the first housing 10CA and the second housing 10CB rotate in the direction in which they are apart from each other, the mobile communication device 10 is opened. When the first housing 10CA and the second housing 10CB rotate in the direction in which they are close to each other, the mobile communication device 10 is closed.

Figure 3:
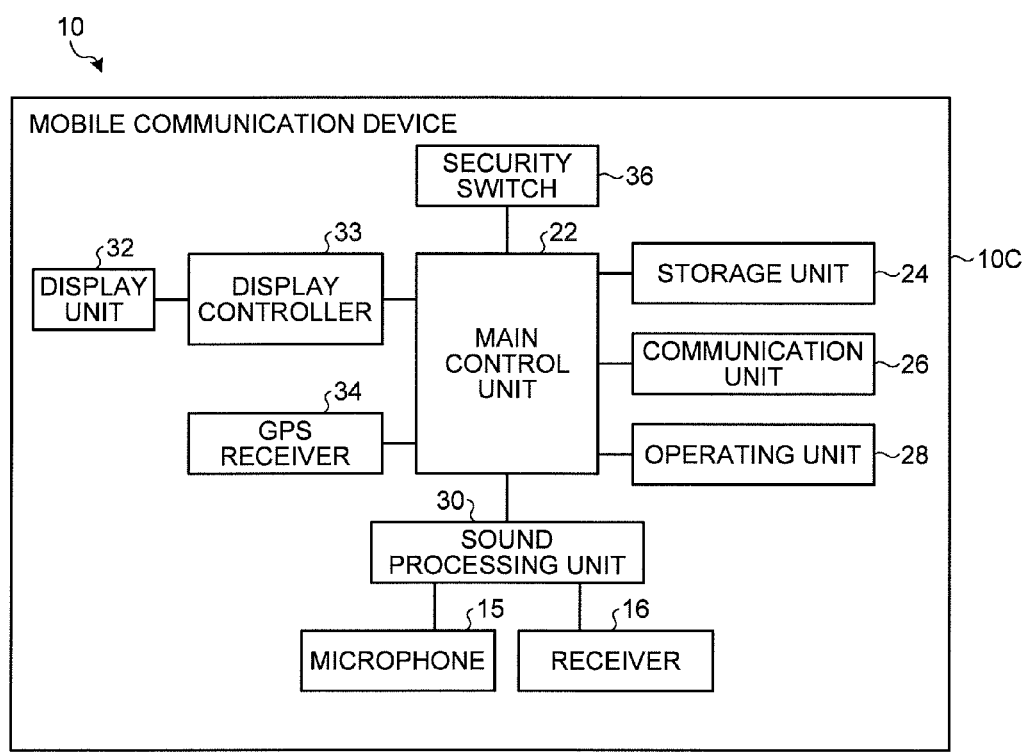
FIG. 3 is a block diagram illustrating the schematic configuration of functions of the mobile communication device illustrated in FIG. 2.

The relationship between the function and the control unit of the mobile communication device 10 will next be described. FIG. 3 is a block diagram illustrating a schematic configuration of the function of the mobile communication device illustrated in FIG. 2. As illustrated in FIG. 3, the mobile communication device 10 includes a main control unit 22, a storage unit 24, a communication unit 26, the operating unit 28, a sound processing unit 30, a display unit 32, a display controller 33, a GPS receiver 34, and a security switch 36.

The main control unit 22 is a processing unit that integrally controls the overall operation of the mobile communication device 10, e.g., a CPU (Central Processing Unit). Specifically, the main control unit 22 controls the operations of the communication unit 26, the display unit 32, and the like in order that various processes of the mobile communication device 10 are executed in an appropriate procedure in accordance with the operation on the operating unit 28 or software stored in the storage unit 24. The main control unit 22 executes the process based upon a program (e.g., an operating system program, an application program, etc.) stored in the storage unit 24. The main control unit 22 can simultaneously execute plural programs (application, software).

The storage unit 24 stores the program and data of the application utilized for the process by the main control unit 22. Specifically, examples of the stored application programs include a program of application performing outgoing, incoming, and calling process, a program of application for processing a security operation, a program of application for processing a rescue operation, and a program of application for sending and receiving an e-mail. Examples of the stored data include image data, sound data, dictionary data for a character conversion, and data of an address book. The storage unit 24 also stores a conversion table that is used for a program of application of sending and receiving character information during the call.

The communication unit 26 establishes a wireless signal path according to a CDMA system, LTE system, or the like between the communication unit 26 and the base station through a channel assigned by the base station of the above-mentioned communication network 3, thereby performing telephone communication and information communication with the base station. Therefore, a user can make a call with a desired party according to the communication by the communication unit 26.

The operating unit 28 includes the operation key 13 to which various functions are assigned such as a power key, a call key, a numeric key, a character key, and an outgoing key, and the direction/enter key 14. When these keys are inputted through the user's operation, the operating unit 28 generates a signal corresponding to the operation. The generated signal is inputted to the main control unit 22 as the user's instruction.

The sound processing unit 30 performs process for a sound signal inputted to the microphone 15 and a sound signal outputted from the receiver 16.

The display unit 32 includes a display panel (the above-mentioned main display 12M) having a liquid crystal display (LCD, Liquid Crystal Display) or organic EL (Organic Electro-Luminescence) panel, and displays a video image according to video image data fed from the main control unit 22 via the display controller 33 and an image according to the image data.

The GPS receiver 34 is a communication unit that receives the GPS signal transmitted from the GPS satellite 2. The GPS receiver 34 also calculates a latitude and a longitude of the mobile communication device 10 from the received GPS signal, and sends the information of the calculated latitude and longitude to the main control unit 22. The GPS receiver 34 acquires the GPS signal from plural GPS satellites 2, and calculates a distance from each of the GPS satellites 2 based upon a time difference between the time information included in the GPS signal and the acquired time information, and the intensity of the received radio wave. The GPS receiver 34 analyzes the distance from each GPS satellite 2 and the position information of each GPS satellite 2, thereby calculating the position of the GPS receiver 34.

The security switch 36 can be turned ON or OFF by the user's operation. The security switch 36 sends ON-information or OFF-information to the main control unit 22. A switch that can change its position by being pulled or pushed can be used as the security switch 36. A switch that is configured to be a member detachable to the housing 11, and that is in an ON state when connected to the housing 11 and in an OFF state when separated from the housing 11 can be used for the security switch 36.

Figure 4:
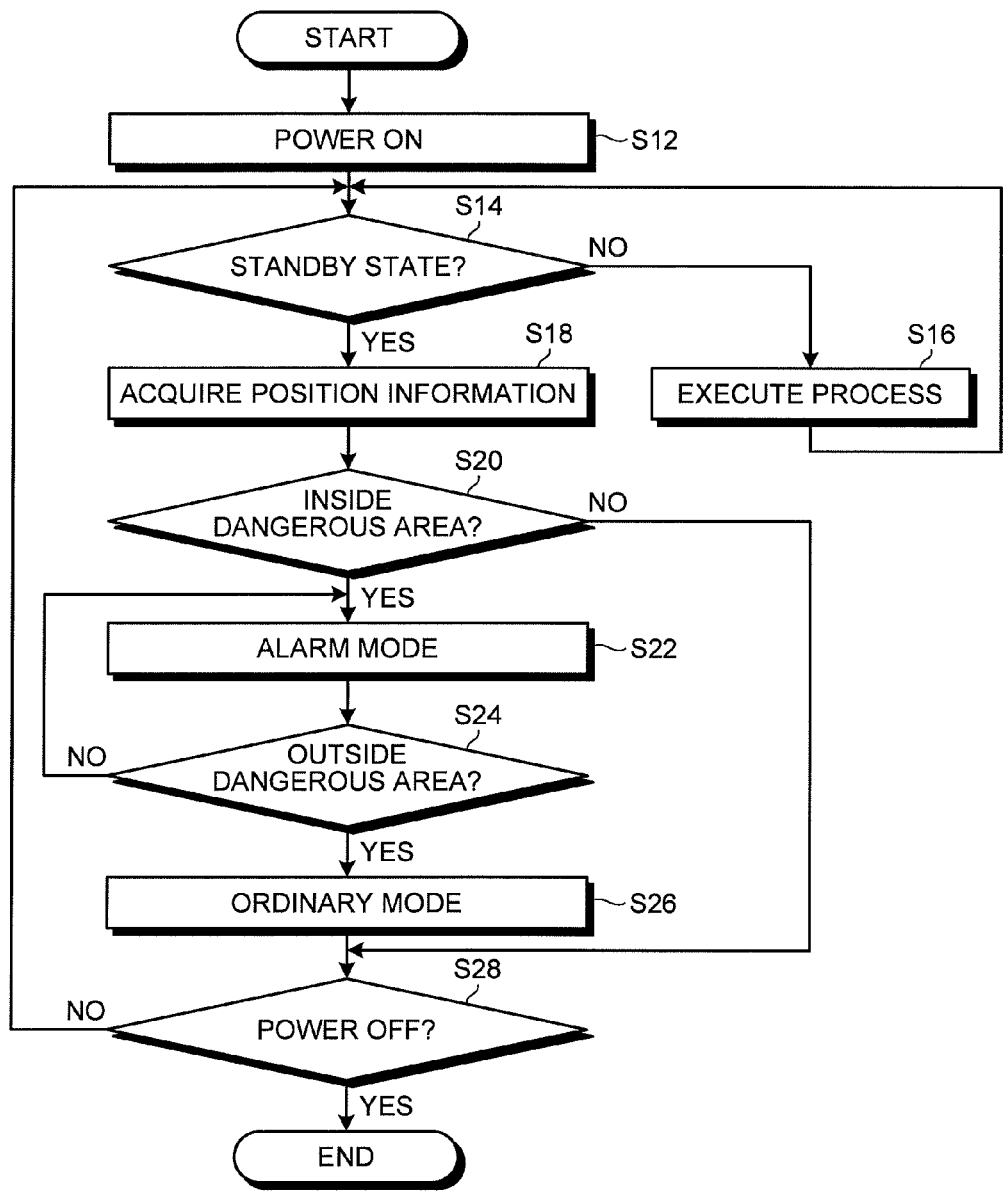
FIG. 4 is a flowchart illustrating one example of a process operation of the mobile communication device.

The operation of the mobile communication device 10 will next be described with reference to FIG. 4. FIG. 4 is a flowchart illustrating one example of the process operation of the mobile communication device. When a predetermined condition is satisfied by the execution of the program of the application of processing the security operation, stored in the storage unit 24, by the main control unit 22, the mobile communication device 10 executes an operation of a security mode.

The mobile communication device 10 is turned OFF, i.e., an electric power supply to each unit is stopped, and no image is displayed on the display unit 32 at the beginning. The power of the mobile communication device 10 is turned ON from this state at Step S12. Specifically, when detecting an instruction of turning ON the power, that is, when the power button on the operating unit 28 is pressed by the user, or when it comes time when the ON operation of the power is set by a timer, the main control unit 22 turns ON the power. Specifically, the main control unit 22 starts the electric power supply to the respective units so as to start various functions. The main control unit 22 is configured to execute only the minimum function while the power is turned OFF. The main control unit 22 reads the application program of processing the security operation from the storage unit 24, and starts the application for processing the security operation. When the power is turned ON at Step S12, the main control unit 22 starts the process of the security operation.

After the power is turned ON at Step S12, the mobile communication device 10 determines whether it is in the standby state or not at Step S14. The standby state means that the mobile communication device 10 waits for the input of the user's operation or waits for the satisfaction of the conditions set beforehand (means that the mobile communication device 10 displays a so-called standby screen). In the standby state, the applications excluding the program that is always run are not started.

When determining that the mobile communication device 10 is not in the standby state (No) at Step S14, the main control unit 22 executes the application process at Step S16. The case where the main control unit 22 determines that the mobile communication device 10 is not in the standby state at Step S14 means that any applications are executed. Therefore, the main control unit 22 executes the process of the application (e-mailing, calling, accessing websites) currently executed. After executing the process at Step S16, the main control unit 22 proceeds to Step S14 so as to again determine whether the mobile communication device 10 is in the standby state or not.

When determining that the mobile communication device 10 is in the standby state (Yes) at Step S14, the main control unit 22 acquires position information at Step S18. Specifically, the main control unit 22 communicates with the GPS satellite 2 by the GPS receiver 34 for acquiring its position information. The main control unit 22 also acquires map information including information of a dangerous area together with its position information. The method of acquiring the map information is not particularly limited. For example, the mobile communication device 10 may store the map information in the storage unit 24 and read the data therefrom. Alternatively, the mobile communication device 10 may acquire the map information from an external storage device (server 6), for example, via the communication unit 26. In this case, the main control unit 22 may acquire the map information with the acquired its position information being used as a reference (e.g., with its position information being included in the map information). The main control unit 22 may detect its location through the communication with the base station, and may read or acquire the map information beforehand.

After acquiring the position information and the map information at Step S18, the main control unit 22 determines that it is inside the dangerous area or not at Step S20. Specifically, the main control unit 22 determines whether its position information acquired at step S18 is included in the dangerous area (dangerous district, dangerous region) or not (whether the main control unit 22 is in the dangerous area or not). The dangerous area is area (location) information acquired together with the map information, and it is an area where crimes or accidents occur in the past, an area where the peace is disturbed, a dark area, or an empty area. In other words, the dangerous area is the area where the possibility that a user gets involved with a dangerous situation such as a crime is higher than the other areas. In the information of the dangerous area, the degree of danger is set depending upon an area. In the present embodiment, the degree of danger is set to four levels of "under low", "low", "middle", and "high".

When determining that it is not the dangerous area (No), i.e., determining that its position information is not included in the dangerous area (outside the dangerous area) at Step S20, the main control unit 22 proceeds to Step S28. When determining that it is inside the dangerous area (Yes), i.e., determining that its position information is included in the dangerous area at Step S20, the main control unit 22 executes an alarm mode at Step S22. The alarm mode will be described later.

When executing the alarm mode at Step S22, the main control unit 22 determines whether it is outside the dangerous area or not at Step S24. More specifically, the main control unit 22 acquires its position information as at Step S18, compares its position information and the information of the dangerous area, and determines whether its position information is outside the dangerous area or not, i.e., the main control unit 22 is outside the dangerous area or not, at Step S24.

When determining that it is not outside the dangerous area (No), i.e., determining that the main control unit 22 is in the dangerous area at Step S24, the main control unit 22 proceeds to Step S22. Specifically, the main control unit 22 repeats the process at Step S22 and the process at Step S24 until determining that the main control unit 22 is outside the dangerous area.

When determining that the main control unit 22 is outside the dangerous area (Yes), i.e., the main control unit 22 is not in the dangerous area at Step S24, the main control unit 22 executes an ordinary mode at Step S26. The ordinary mode means a state in which the alarm mode is not executed. The main control unit 22 then proceeds to Step S28.

When the main control unit 22 makes No determination at Step S20, or when the process at Step S26 is ended, the main control unit 22 determines whether the power is turned OFF or not at Step S28. Specifically, the main control unit 22 determines that there is an instruction of turning OFF the power, i.e., an instruction of ending the drive of the mobile communication device 10. The main control unit 22 determines that the instruction of ending is inputted, when the power button on the operating unit 28 is pressed for a certain time, or when it comes time when the operation of turning OFF the power is set by a timer. When determining that the power is not turned OFF (No), i.e., the instruction of turning OFF the power is not detected at Step S28, the main control unit 22 proceeds to Step S14 so as to repeat the above-mentioned processes. When determining that the power is turned OFF (Yes), i.e., the instruction of turning OFF the power is detected at Step S28, the main control unit 22 executes the process of turning OFF the power, and ends the process.

As described above, the mobile communication device 10 determines whether or not the mobile communication device 10 is in the dangerous area based upon the map information including its position information and the information of the dangerous area. If the mobile communication device 10 determines that it is in the dangerous area, the mobile communication device 10 executes the alarm mode.

Figure 5:
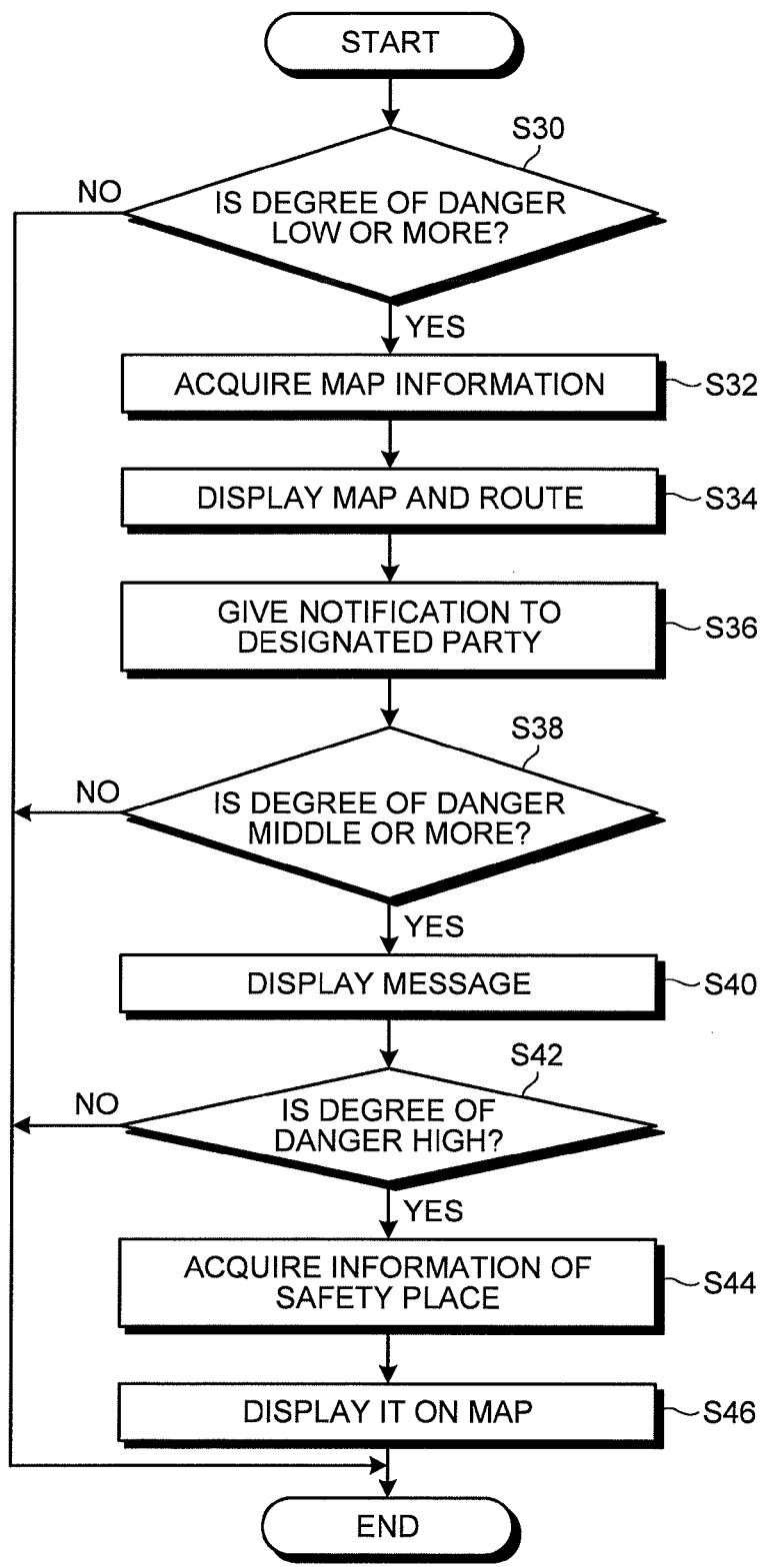
FIG. 5 is a flowchart illustrating one example of a process operation of the mobile communication device.

One example of the alarm mode executed by the main control unit 22 will be described with reference to FIGS. 5, and 6 to 9. FIG. 5 is a flowchart illustrating one example of the process operation of the mobile communication device. FIGS. 6 to 9 are explanatory views illustrating one example of an image displayed on the display unit of the mobile communication device.

When executing the alarm mode, the main control unit 22 lowers a threshold value of a battery (battery, power source unit) in order that the mobile communication device 10 can be used for a longer time than as usual. Lowering the threshold value of the battery means that at least one of the threshold values of the usable battery power of the battery that is currently used, a voltage value and a current value, by which the mobile communication device 10 can be used even if the battery power is reduced, the voltage value is reduced, and the current value is reduced. Thus, the user can use the mobile communication device 10 for a long time. When executing the alarm mode, the main control unit 22 informs the user of the situation in which the user enters the dangerous area with a sound.

Thereafter, the main control unit 22 determines whether or not the degree of danger is "low" or more at Step S30. Specifically, the main control unit 22 determines that the degree of danger of the dangerous area where the acquired its position information is included is "low" or more, i.e., determines that the degree of danger of the dangerous area is "low", "middle", or "high" (determines that it is the one excluding "under low"). When determining that the degree of danger is not any one of "low", "middle", and "high" (No), i.e., determining that the degree of danger is "under low" at Step S30, the main control unit 22 ends the process. Specifically, the main control unit 22 only decreases the threshold value of the battery, and informs the user of the situation that the user enters the dangerous area, and then, ends the process.

When determining that the degree of danger is "low" or more (Yes), i.e., determining that the degree of danger is any one of "low", "middle", and "high", the main control unit 22 acquires the map information at Step S32. The map information acquired at Step S32 is map information including information of roads or location of buildings. If the map information including the information of the dangerous area can be used, the map information may be acquired by reading the same from the area where the map information is stored or is temporarily stored. If the map information is newly acquired, the map information may be acquired from the external storage device through the communication unit 26, or from the data stored in the storage unit 24. It is only necessary that the map information including the information of the dangerous area is the one from which at least the corresponding position can be determined to be the dangerous area. In other words, it is only necessary that the map information is the information with which the area (coordinate) of the dangerous area is associated. The map information does not have to include the information of roads and location of buildings.

When the map information at Step S32 is required, the main control unit 22 displays the map and route at Step S34. Specifically, the main control unit 22 calculates the route for going out of the dangerous area based upon its position information, the information of the dangerous area, and the map information acquired at Step S32. Thereafter, the main control unit 22 superimposes the calculated route and its position on the map information (synthesizes these information pieces) so as to create an image, and displays the created image on the display unit 32.

Figure 6:
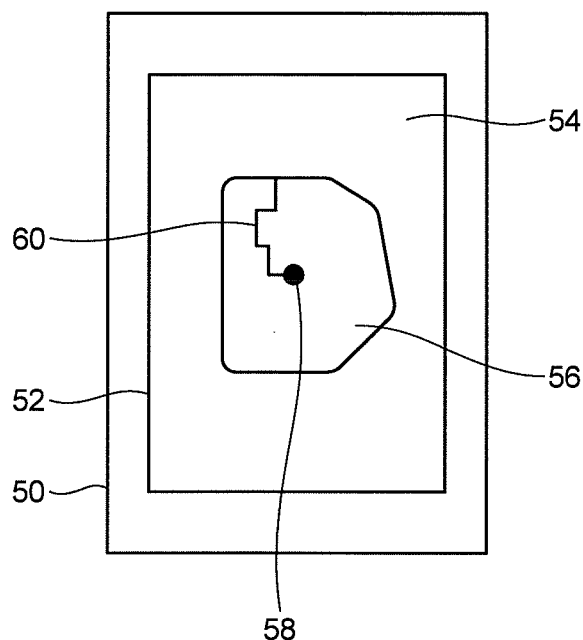
FIG. 6 is an explanatory view illustrating one example of an image displayed on a display unit of the mobile communication device.
Figure 7:
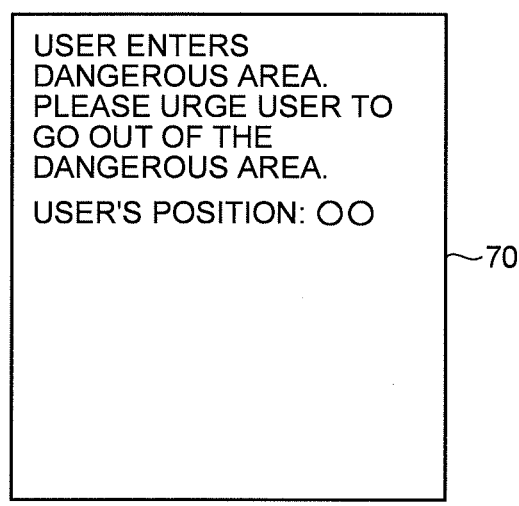
FIG. 7 is an explanatory view illustrating one example of an image displayed on the display unit of the mobile communication device.
Figure 8:
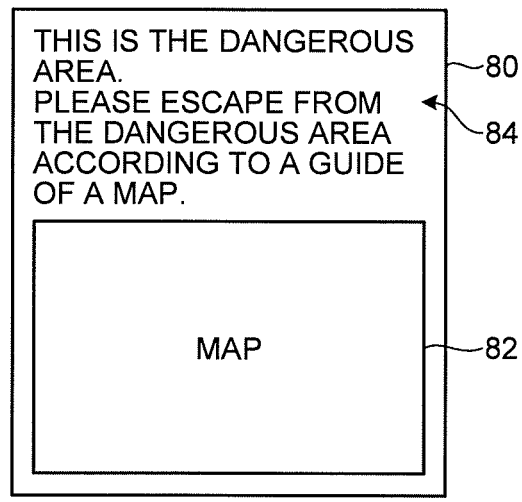
FIG. 8 is an explanatory view illustrating one example of an image displayed on the display unit of the mobile communication device.
Figure 9:
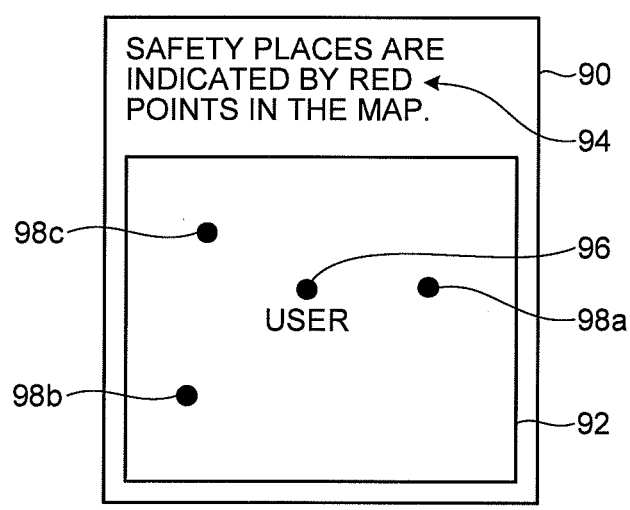
FIG. 9 is an explanatory view illustrating one example of an image displayed on the display unit of the mobile communication device.

Specifically, the main control unit 22 displays an image 50 illustrated in FIG. 6 on the display unit 32. The image 50 includes a map 52. In the map 52, information of roads and/or buildings in both a safety area 54 and a dangerous area 56 are displayed. The safety area 54 is an area that is not the dangerous area. The safety area 54 and the dangerous area 56 are partitioned with a border line. The main control unit 22 may display the safety area 54 and the dangerous area 56 with a different color. The main control unit 22 may also display the dangerous area 56 to be darker (or brighter) than the safety area 54 in order to make the dangerous area 56 more noticeable. In other words, the main control unit 22 may display the safety area 54 and the dangerous area 56 with the different brightness. The main control unit 22 also displays its position information (user's current position) 58 with a point. The main control unit 22 also displays a route 60 from the current position to the safety area 54 with a line. Various routes can be set as the route 60, but the shortest route or the route that is determined to be the safest may be displayed. The user can move to the safety area 54 in a short time by the display of the shortest route. The display of the route that is determined to be the safest can reduce possibility that the user gets involved with a crime or accident.

After displaying the map and route at Step S34, the main control unit 22 gives notification (i.e., sends an emergency signal) to the designated party. The designated party is a communication device of a person, establishment, and agency that are set beforehand, such as a guardian, parent, police office, or school. The main control unit 22 informs the designated party of the situation that the mobile communication device 10 is in the dangerous area (that the user is in the dangerous area) with a sound or message. When the main control unit 22 gives notification by use of a message, the main control unit 22 may send an image 70 illustrated in FIG. 7. The image 70 illustrated in FIG. 7 includes a message indicating that "The user enters the dangerous area. Please urge the user to go out of the dangerous area." and the user's position information such as "user's position: ○○". The message, the manner of displaying the user's position information, and the sentence are not limited to those described above. Any forms can be employed, so long as the situation in which the user enters the dangerous area and the user's position can be reported. The main control unit 22 sends the image 70 to the communication device of the designated party through the communication unit 26. A terminal (server 6) of the security system can be set as the designated party. The case where the image 70 is sent to the terminal (server 6) of the security system will be described later. The process at Step S34 and the process at Step S36 may be executed in the reverse order, or may simultaneously be executed.

The main control unit 22 determines whether the degree of danger is "middle" or more at Step S38 when completing the process at Step S36. Specifically, the main control unit 22 determines whether or not the degree of danger of the dangerous area containing the acquired its position information (the position where the main control unit 22 is present) is "middle" or more, i.e., is "middle" or "high". When determining that the degree of danger is neither "middle" nor "high" (No), i.e., determining that the degree of danger is "low", the main control unit 22 ends this process.

When determining that the degree of danger is "middle" or more (Yes), i.e., the degree of danger is either one of "middle" and "high" at Step S38, the main control unit 22 displays a message at Step S40. The main control unit 22 allows the display unit 32 to display not only the map information but also the message. Specifically, the main control unit 22 displays an image 80 illustrated in FIG. 8 on the display unit 32. The image 80 includes a map 82 and a message 84 composed of character information. The map 82 is basically the same as the map 52 represented on the image 50 illustrated in FIG. 6. The message 84 indicates that "this is the dangerous area. Please escape from the dangerous area according to a guide of the map." The message 84 is not limited to the one in the present embodiment. Any sentence can be used, so long as it requests the movement from the dangerous area to the safety area. The main control unit 22 displays the image 80 every 5 minutes.

The main control unit 22 determines whether the degree of danger is "high" or not at Step S42 after the process at Step S40 is ended. Specifically, the main control unit 22 determines whether the degree of danger of the dangerous area including the acquired its position information (the position where the main control unit 22 is present) is "high" or not. When determining that the degree of danger is not "high" (No) at Step S42, i.e., determining that the degree of danger is "middle", the main control unit 22 ends this process.

When determining that the degree of danger is "high" (Yes) at Step S42, the main control unit 22 acquires information of one or more safety places at Step S44. The safety place is the safety place even in the dangerous area, i.e., the place that can be an evacuation spot. For example, the safety place is a police station, a convenience store, store, or a building where a security guard always stays. The main control unit 22 can acquire the safety place by various methods. Specifically, the main control unit 22 can acquire the safety place in the same manner as the map information described above.

After acquiring the information of the safety place at Step S44, the main control unit displays the safety place on the map at Step S46. Specifically, the main control unit 22 allows the display unit 32 to display an image 90 illustrated in FIG. 9. When there are plural safety places, the main control unit 22 preferentially may select the place where the distance from the user's position is the shortest, or the place that can be arrived through an area having relatively a low degree of danger. The main control unit 22 may also display the route to the safety place. The image 90 includes a map 92 and a message 94 composed of character information. A user's position 96 and safety places 98a, 98b, and 98c are displayed on the map 92. The safety places 98a, 98b, and 98c are displayed with red points. Although not illustrated, the map 92 continuously displays the border line between the safety area and the dangerous area, and the route to the safety area. The message 94 indicates that "safety places are indicated by red points in the map." In other words, the message 94 is an explanation of the method of identifying the safety places. The main control unit 22 displays the image 90 every 5 minutes. When completing the process at Step S96, the main control unit 22 ends the process of the security mode. The main control unit 22 repeats the process of the security mode illustrated in FIG. 5 until the main control unit 22 moves to the ordinary mode.

As described above, when detecting that the user enters the dangerous area, the mobile communication device 10 executes the alarm mode, thereby being capable of reducing the possibility that the user gets involved with a crime or accident. The process to be executed is changed according to the degree of danger of the dangerous area, whereby an alarm according to the degree of danger can be executed.

Since the mobile communication device 10 displays the map information and the route 60 for escaping from the dangerous area on the display unit 32, the user can efficiently escape from the dangerous area. Therefore, the mobile communication device 10 can reduce more the possibility that the user gets involved with a crime or accident.

Since the mobile communication device 10 displays the information of the safety place even in the dangerous area, the user can move to the safety place without being lost at the approach of danger. Thus, the possibility that the user gets involved with a crime or accident can be reduced more.

The mobile communication device 10 informs the designated party of the situation in which the user enters the dangerous area, together with the place information. Therefore, the guardian or the like can know this situation. Accordingly, the possibility that the user gets involved with a crime or accident can be reduced more.

In the present embodiment, the process to be executed is changed according to the degree of danger in order to efficiently execute necessary and sufficient alarm. However, the present invention is not limited thereto. The process executed according to each of the degree of dangers may be executed according to any one of the degree of dangers.

When the mobile communication device 10 has an image capturing function or recording function, the mobile communication device 10 may capture an image, start taking moving pictures, or start recording for every fixed time, when the alarm mode is executed, or when the degree of danger reaches the predetermined extent.

The mobile communication device 10 may display not only the route to the safety area but also the route to the safety place. This can allow the user to move to the safety place in a short period with safe.

Figure 10:
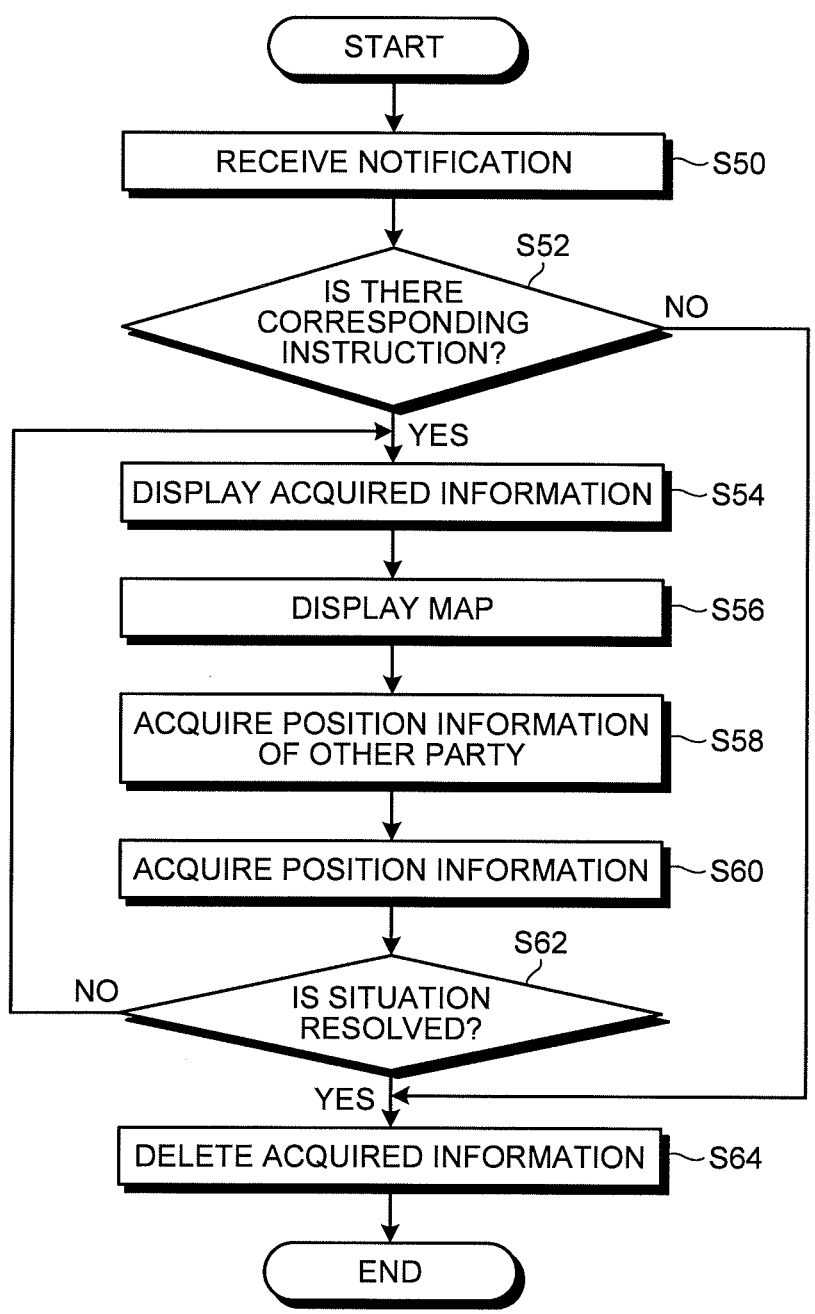
FIG. 10 is a flowchart illustrating one example of a process operation of the mobile communication device.
Figure 11:
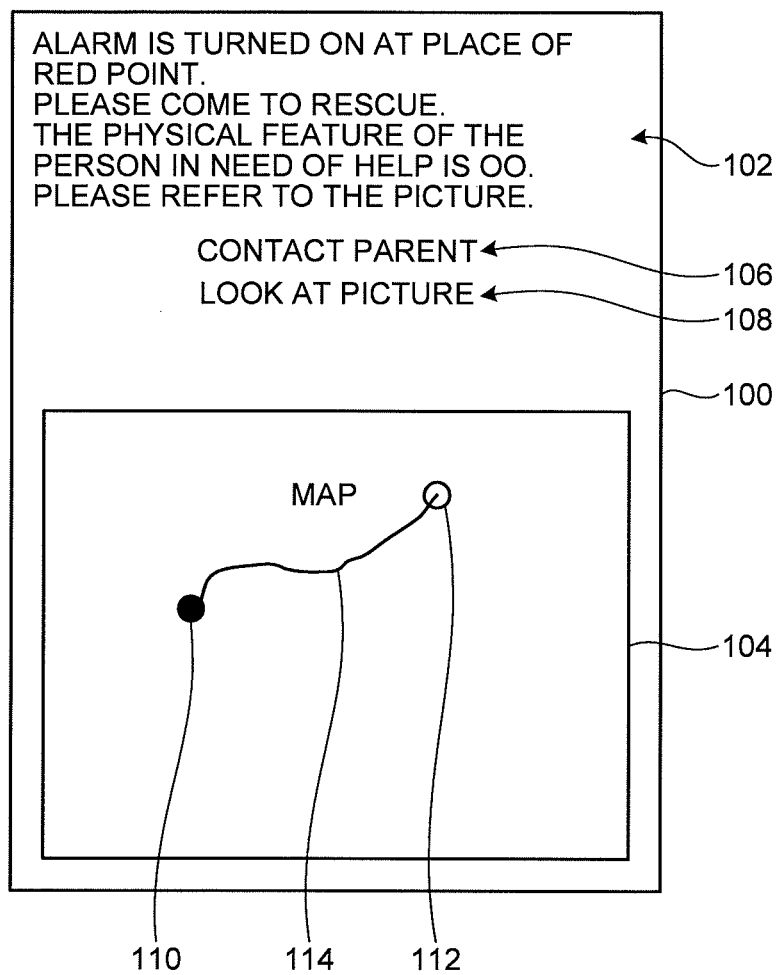
FIG. 11 is an explanatory view illustrating one example of an image displayed on the display unit of the mobile communication device.

The process of the other mobile communication device 10 to which the message indicating that the user enters the dangerous area is given from the mobile communication device 10 will be described next with reference to FIGS. 10 and 11. Specifically, the operation of the main control unit 22 executing the application for processing the rescue operation will be described. The mobile communication device 10 that sends the message indicating that the user enters the dangerous area and the mobile communication device 10 that performs the rescue operation are different. In the description below, the mobile communication device 10a sends the message indicating that the user enters the dangerous area, and the mobile communication device 10b performs the rescue operation. Specifically, the mobile communication device 10b is set as the designated party of the mobile communication device 10a. FIG. 10 is a flowchart illustrating one example of the process operation of the mobile communication device, and FIG. 11 is an explanatory view illustrating one example of an image displayed on the display unit of the mobile communication device.

When the mobile communication device 10a outputs the information indicating that the user enters the dangerous area, the main control unit 22 of the mobile communication device 10b receives the notification at Step S50. Specifically, the control unit 22 receives the information indicating that the user enters the dangerous area from the mobile communication device 10a through the communication unit 26. FIG. 10 basically illustrates the processes of the respective units of the mobile communication device 10b if not otherwise specified.

When receiving the notification at Step S50, the main control unit 22 determines whether the corresponding instruction is issued or not at Step S52. Specifically, the main control unit 22 determines whether the instruction of performing the rescue operation of the user of the mobile communication device 10a, who enters the dangerous area, is inputted or not.

When determining that there is no corresponding instruction (No) at Step S52, i.e., determining that the instruction of not performing the rescue operation is inputted, or no operation is made in a fixed period, the main control unit 22 proceeds to Step S64.

When determining that there is the corresponding instruction (Yes) at Step S52, i.e., determining that the instruction of performing the rescue operation is inputted, the main control unit 22 displays the acquired information at Step S54, and displays the map at Step S56. As illustrated in FIG. 11, the main control unit 22 displays the acquired information and the map on the display unit 32 as one image 100. The image 100 includes a message 102, a map 104, an item 106, and an item 108. The message 102 indicates that "the alarm is turned on at place of red point. Please come to rescue. The physical feature of the person in need of help is OO. Please refer to the picture."

A position 110 of the mobile communication device 10a, a position 112 of the mobile communication device 10b, and a route 114 from the position 112 to the position 110 of the mobile communication device 10a are displayed on the map 104. Here, the main control unit 22 detects its position information by using the GPS receiver 36 so as to acquire the position information of the mobile communication device 10a and the map information. The main control unit 22 calculates the route from its position to the position of the mobile communication device 10a based upon the acquired its position information, the position information of the mobile communication device 10a, and the map information. Thus, the main control unit 22 displays the acquired or calculated positions 110 and 112 and the route 104 on the map 104, wherein they are superimposed with one another.

The map information and the position information of the mobile communication device 10a may be acquired together with the notification received at Step S50, or may be acquired through another communication. The data of the map information stored in the storage unit 24 of the mobile communication device 10b may be used as described above.

The item 106 is the one with which the sentence of "contact parent" is associated, and item 108 is the one with which the sentence of "look at the picture" is associated. The items 106 and 108 have a short-cut function. When the item 106 is selected (clicked), the main control unit 22 puts a call in to the communication device, which is registered as the communication device of the parent, without displaying the phone number. When the item 108 is selected (clicked), the main control unit 22 displays the picture.

After displaying the map at Step S56, the main control unit 22 acquires the position information of the other party at Step S58. Specifically, the main control unit 22 acquires (updates) again the position information of the mobile communication device 10a. When acquiring the position information of the other party at Step S58, the main control unit 22 also acquires (updates) its position information at Step S60.

Thereafter, the main control unit 22 determines whether the situation is resolved or not at Step S62. Specifically, the main control unit 22 determines whether the user of the mobile communication device 10a is rescued or not. It can be set such that the main control unit 22 determines whether the user is rescued or not based upon various references. For example, it can be set such that, if the position information detected at Step S58 is outside the dangerous area, the user is determined to be rescued. It can also be set such that, if the position information detected at Step S58 and the position information detected at Step S60 are on the same coordinate, it is determined that the other party is found and rescued. It can also be set such that the user is determined to be rescued, if the operator of the mobile communication device 10a or the mobile communication device 10b inputs a predetermined operation.

When determining that the situation is not resolved (No) at Step S62, the main control unit 22 proceeds to step S54 to repeat the processes described above. When determining that the situation is resolved (Yes) at Step S62, the main control unit 22 deletes the acquired information at Step S64, i.e., deletes the information acquired at Step S50, and ends the process.

As described above, the mobile communication device 10 (in the present embodiment, the mobile communication device 10b) can perform the above-mentioned process by executing the application of processing the rescue operation. Specifically, the mobile communication device 10b displays the route to the mobile communication device 10a based upon its position information, the position information of the mobile communication device 10a that issues the notification, and the map information, thereby being capable of reaching the place where the user of the mobile communication device 10a is present without being lost. The main control unit 22 repeats the processes from Step S54 to Step S62 until the situation is resolved. Therefore, the main control unit 22 can update the respective position information, and even if they both move, the mobile communication device 10b allows itser to reach the place where the user of the mobile communication device 10a is present in a shorter period. Since the position is displayed as the image, a person who cannot notice the situation with a sound can be notified. Specifically, even if a person cannot hear a scream, he/she can reach the place where the holder of the mobile communication device 10a is present.

Since the physical feature or the picture information is received and displayed as information, a person (a person in a security company, or policeman) who has no personal acquaintance with the holder can correctly find the holder of the mobile communication device 10a, when such a person goes to holder's rescue. After the situation is resolved, the information is deleted, whereby the leakage of the personal information can be prevented. As in the present embodiment, the phone number is not directly displayed, but the character information is displayed, and the phone number is not displayed during the call, whereby the leakage of the personal information is prevented. The personal information that is not displayed is not limited to the phone number. A mail address can also be set as not being displayed. The information described above may be set to be non-transferable. This process can prevent the leakage of the personal information.

Since the position information of the person in need of help can correctly been found based upon the GPS signal, a person who is very close to the person in need of help can rapidly come to the rescue. The situation in which a person who is actually far from the person in need of help comes to the rescue can be prevented, whereby the person in need of help can efficiently be rescued.

In the above-mentioned embodiment, the communication device held by the person in need of help is defined as the mobile communication device, since the mobile communication device has high mobility, can smoothly launch a search, and has high validity of updating the information. However, the present invention is not limited thereto. A fixed-type communication device, such as a fixed terminal or fixed-line phone, can also be used. In the case of the fixed-line phone, a facsimile function may be used to display an image. When the fixed-type communication device is used, the map information may be stored in the communication device of a person in need of help, and only the position information is transmitted.

The above-mentioned embodiment describes that the notification (notification of a call for help, transmission of an emergency signal) is directly given to the mobile communication device 10b that is designated as the designated party by the user of the mobile communication device 10a. However, the present invention is not limited thereto. The communication system 1 may use one of the servers 6 as the server 6 for the service providing the security system. In this case, the communication system 1 designates the server 6 as the designated party of the user of the mobile communication device 10a. The server 6 has information of the communication device (a fixed-line phone, or a fixed terminal in a police box, a mobile communication device held by a police officer or a patrolling security officer, or a fixed-line phone or fixed terminal in a convenience store), which is the contact information, for each of areas set as the dangerous area. If the mobile communication device 10b receives the information indicating that the mobile communication device 10a is in the dangerous area, it transmits the notification of the danger to the communication device, which is the contact information, within the dangerous area. As descried above, the server 6 temporarily receives the information from the mobile communication device 10a, and sends this information to the communication devices around this point at a time, whereby the person who should be rescued can be rescued in a short period.

It may be configured such that the server 6 periodically receives the position information from the mobile communication device 10, which is set as the communication device of a person in need of help, and if the server 6 receives the notification from the mobile communication device 10*a*, the server 6 gives notification of a request of help to the mobile communication devices within a certain range around the mobile communication device 10*a*. In the communication system 1, the notification of a need of help can be given to all mobile communication devices 10 within a predetermined area. However, in order to secure the protection of the personal information, the notification may be given to the mobile communication device in a certain area out of the specific mobile communication devices 10 set beforehand.

When the communication system 1 described above is used, the server 6 can correctly specify the position of the mobile communication device that gives the notification of a need of help, and can select the mobile communication device of a person in need of help from this position. Thus, the number of the communication devices and the range that the server 6 gives the notification can be narrowed, whereby the notification with high validity can be made. Since the number of the communication devices is narrowed, the possibility of the leakage of the personal information can be reduced more.

It may be configured such that the server 6 transmits, as the first notification, the position information of the mobile communication device 10*a* and the notification confirming whether or not it can resolve the situation (it can come to rescue), and then, transmits the personal information only to the communication device that transmits the notification indicating that it can resolve the situation. This process can prevent the personal information from being transmitted to the communication devices more than necessary.

In the present embodiment, the mobile communication device 10 (or 10*a*) sends the information if it enters the dangerous area. However, the present invention is not limited thereto. It may be configured such that, if the security switch 36 is turned ON in the dangerous area, the notification of a need of help (notification of an occurrence of an emergency situation) is given to the designated party. It may also be configured such that, if the security switch 36 is turned ON even outside the dangerous area, the similar process is executed, although this system increases the process load and monitoring load of the communication system 1.

When the application of processing the security operation described with reference to FIGS. 4 and 5 is executed, the determination of the degree of danger may be changed between the ON state and OFF state of the security switch 36. Specifically, it may be determined such that, when the security switch 36 is turned OFF, the degree of danger is low, and when the security switch 36 is turned ON, the degree of danger is high, even if the person in need of help is in the same location.

It may be configured such that the dangerous area can be added, changed, and deleted according to the setting by the user. Accordingly, the dangerous area can appropriately be set depending upon a person holding the mobile communication device, e.g., depending upon whether the holder of the mobile communication device is a child or an elderly person. The degree of danger of the dangerous area is not only determined according to the public safety, but also determined according to the holder. For example, when the holder of the mobile communication device is not allowed to drink alcohol, an entertainment area may be set as the dangerous area. Accordingly, the case where the user takes improper behavior is determined as being dangerous, and this situation can be reported.

It may be configured such that the main control unit 22 determines whether the person in need of help is in the dangerous area or not by utilizing not only the position information but also sound information. For example, the main control unit 22 can determine that the person in need of help is in a pachinko parlor by receiving the sound. When the sound information is utilized, the determination may be made as to whether the sound unique to the place is received or not, or based upon the volume of the sound. As described above, the position can be specified with higher accuracy by combining the position information and the other information.

The information of the dangerous area may be acquired from the external storage device such as the server 6, as needed. However, the information of the dangerous area may be updated every fixed period (one month or two months), and as described above, the user may adjust the information in consideration of the season or time. This process makes it possible to appropriately set the dangerous area. This process can also reduce cost for the communication, and save the battery. The dangerous area may be set not by the mobile communication device of a person who should be protected, but by the communication device that is set as being held by a guardian. This can prevent that the setting is changed without permission.

As described above, the mobile communication device may include the application program for processing the security operation and the application program for processing the rescue operation. However, the mobile communication device may include either one of them. Specifically, the mobile communication device may include both the function of sending an emergency signal (requesting a help) and the function of receiving the emergency signal (going to a rescue), but may be configured to include only the function of requesting a help or only the function of going to a rescue. When the mobile communication device includes both functions, the function to be used (executed) may be selected depending upon the situation.

INDUSTRIAL APPLICABILITY

As described above, the mobile communication device according to the present invention is well adaptable to a communication device having a security function.

The invention claimed is:
1. A communication system, comprising a mobile communication device and a communication device, wherein:
the mobile communication device includes
a communication unit configured to communicate with the communication device,
a position information acquiring unit configured to acquire the mobile communication device's position information,
a map information acquiring unit configured to acquire map information including information of a dangerous area, and
a control unit configured to
detect that the mobile communication device is in the dangerous area based upon the mobile communication device's position information and the map information, and
in response to a detection that the mobile communication device is in the dangerous area based upon the mobile communication device's position information and the map information, cause the communication unit to transmit the mobile communication device's position information and an emergency signal; and the communication device is configured to,
when detecting that the emergency signal and the mobile communication device's position information are transmitted from the mobile communication device,
display the mobile communication device's position information and the communication device's position information on a display unit of the communication device.

2. The communication system according to claim 1, wherein the communication device is a second mobile communication device.

3. The communication system according to claim 1, wherein
the communication device is configured to display, on the display unit of the communication device,
the mobile communication device's position information and the communication device's position information on a map, and
a route from the communication device's position to the mobile communication device's position.

4. The communication system according to claim 1, further comprising:
a server that is configured to establish communication with other communication devices, wherein
the server is configured to, when detecting that the emergency signal is transmitted from the mobile communication device,
determine the communication device to which the emergency signal and the position information of the mobile communication device are transmitted based upon the mobile communication device's position information, and
transmit the emergency signal and the mobile communication device's position information to the determined communication device.

5. The communication system according to claim 4, wherein
the server is configured to transmit map information to the communication device based upon the position information transmitted from the mobile communication device and the communication device.

6. The communication system according to claim 1, wherein
the mobile communication device further includes an emergency switch, and is configured to transmit the emergency signal by the communication unit when an operation set beforehand is inputted to the emergency switch.

7. The communication system according to claim 1, wherein
the communication device is configured
to acquire information of a holder of the mobile communication device, and
to display the information in a manner that prevents personal information of the holder from being leaked.

8. A mobile communication device, comprising:
a communication unit configured to communicate with a second mobile communication device;
a position information acquiring unit configured to detect the mobile communication device's position information;

a map information acquiring unit configured to acquire map information;
a display unit; and
a control unit configured
to acquire the second communication device's position information through the communication unit, when detecting that an emergency signal is outputted from the second mobile communication device,
wherein the emergency signal is outputted from the second mobile communication device in response to a detection, by a control unit of the second mobile communication device, that the second mobile communication device is in a dangerous area based upon the second mobile communication device's position information and map information, and
to display, on the display unit,
a map corresponding to the map information acquired by the map information acquiring unit,
the mobile communication device's position information acquired by the position information acquiring unit, and
the second mobile communication device's position information acquired through the communication unit,
wherein the mobile communication device's position information and the second mobile communication device's position information are superimposed on the map.

9. The mobile communication device according to claim 8, wherein
the control unit of the mobile communication device is configured to display, on the display unit, a route from the mobile communication device's position to the second mobile communication device's position as being superimposed on the map.

10. The mobile communication device according to claim 8, wherein
the map information acquiring unit is configured to acquire the map information including the mobile communication device's position information from an external storage device based upon the mobile communication device's position information acquired by the position information acquiring unit.

11. The mobile communication device according to claim 8, wherein
the position information acquiring unit is configured to acquire the mobile communication device's position information according to a global positioning system.

12. The mobile communication device according to claim 8, wherein
the control unit is configured to
acquire information of a holder of the second mobile communication device, and
display the acquired information of the holder in a manner that prevents personal information of the holder from being leaked.

13. The mobile communication device according to claim 12, wherein
the control unit is configured to delete the acquired information of the holder when the second mobile communication device's position information satisfies a predetermined condition set beforehand.

14. The mobile communication device according to claim 8, wherein the communication unit is configured to acquire information of the second mobile communication device through a server.

15. A mobile communication device, comprising:
a communication unit configured to communicate with a second mobile communication device;
a position information acquiring unit configured to detect the mobile communication device's position information;
a map information acquiring unit configured to acquire map information including information of a dangerous area;
an image display unit configured to display an image; and
a control unit configured to
  detect that the mobile communication device is in the dangerous area based upon the mobile communication device's position information and the map information, and
  in response to a detection that the mobile communication device is in the dangerous area based upon the mobile communication device's position information and the map information,
  cause the communication unit to transmit the mobile communication device's position information and an emergency signal to the second mobile communication device, and
  display, on the display unit, the mobile communication device's position information, and a route for reaching an area outside the dangerous area, as being superimposed on the map information.

16. The mobile communication device according to claim 15, wherein
the map information acquiring unit is configured to acquire information of a safety place within the dangerous area, and
the control unit is configured to display the information of the safety place as being superimposed on the map information.

* * * * *